(12) United States Patent  
Ormson (10) Patent No.: US 8,036,649 B2
(45) Date of Patent: Oct. 11, 2011

(54) MOBILE COMMUNICATIONS DEVICE AND METHOD OF UPDATING TELEPHONE DIRECTORY OF MOBILE COMMUNICATIONS DEVICE

(75) Inventor: Richard Ormson, Reading (GB)

(73) Assignee: NEC Corporation, Tokyo (JP)

( * ) Notice: Subject to any disclaimer, the term of this patent is extended or adjusted under 35 U.S.C. 154(b) by 1033 days.

(21) Appl. No.: 11/910,189

(22) PCT Filed: Apr. 21, 2006

(86) PCT No.: PCT/JP2006/308449
§ 371 (c)(1),
(2), (4) Date: Sep. 28, 2007

(87) PCT Pub. No.: WO2006/115215
PCT Pub. Date: Nov. 2, 2006

(65) Prior Publication Data
US 2009/0054053 A1 Feb. 26, 2009

(30) Foreign Application Priority Data
Apr. 22, 2005 (GB) .................................. 0508180.7

(51) Int. Cl.
*H04M 3/00* (2006.01)
(52) U.S. Cl. ...................................................... 455/418
(58) Field of Classification Search ............... 455/556.2, 455/418
See application file for complete search history.

(56) References Cited

U.S. PATENT DOCUMENTS

| 6,374,100 B1 | 4/2002 | Smith et al. |
| 6,832,084 B1 | 12/2004 | Deo et al. |
| 2004/0204117 A1 | 10/2004 | Weiner |

FOREIGN PATENT DOCUMENTS

| EP | 1 073 298 A2 | 1/2001 |
| EP | 1 211 906 A2 | 6/2002 |
| EP | 1 523 204 A1 | 4/2005 |
| JP | 06-141109 A | 5/1994 |
| JP | 6-141109 A | 5/1994 |
| JP | 10-209942 A | 8/1998 |
| JP | 2001-45553 A | 2/2001 |
| JP | 2002-57621 A | 2/2002 |
| JP | 2002-57807 A | 2/2002 |
| JP | 2005-20583 A | 1/2005 |
| WO | 98/23108 A2 | 5/1998 |
| WO | 99/29127 A1 | 6/1999 |

*Primary Examiner* — William D Cumming
(74) *Attorney, Agent, or Firm* — Sughrue Mion, PLLC (57) ABSTRACT

A mobile communications device includes: a telephone directory storage unit for storing a telephone directory; a comparator for comparing a service identifier included in a received message with a service identifier stored in the telephone directory; and an update unit for updating the telephone number stored in the telephone directory. If the service identifier corresponding to the telephone number received in the message matches the service identifier stored in the telephone directory, the update unit updates the telephone number stored in the telephone directory with the received telephone number.

33 Claims, 7 Drawing Sheets

MOBILE COMMUNICATIONS DEVICE AND METHOD OF UPDATING TELEPHONE DIRECTORY OF MOBILE COMMUNICATIONS DEVICE

TECHNICAL FIELD

This invention relates to a mobile communications device, which is preferably a mobile telephone handset or a mobile telephone, a method of updating a telephone directory of a mobile communications device, and a computer program for implementing the method.

BACKGROUND ART

When the user of a mobile communications device such as a mobile telephone or a portable telephone is away from the user's usual location, entries stored in the user's phone book that relate to local services, for example the local police station, taxi firm, or takeaway, have limited use. Therefore, a system whereby the number is updated to give a service appropriate to the user's location is helpful to the user.

There are already location-based information services available on a number of networks. These services are generally accessed through WAP (Wireless Application Protocol) or i-Mode®, and require the users to perform a relatively complex operation to reach the telephone number for which they are looking. This deters many users from making use of location-based services at all and for others, it limits their use to when there is no other choice.

Furthermore, for users to take advantage of such services, they must have relatively advanced handsets (portable telephones), which many users do not have, and also be happy to use more complex features, which many users are not.

Modern communications devices include a facility, typically known as a phone book, for users to store frequently used telephone numbers. Usually the phone book is provided with a "number" and corresponding "name" field. The user can easily find the desired number by using the phone book. The phone book data can either be stored in the mobile telephone itself, or in the SIM (Subscriber Identity Module) card which is in the mobile telephone, or in both. The data from these different sources are typically presented to the user in a single display, the data being combined into a standard format by the mobile communications device.

Following the implementation of phase 2 of the GSM (Global System for Mobile Communications) standard, many modern mobile communications devices allow for the broadcast of short message strings which uses the short message service (SMS) cell broadcast channels. The SMS cell broadcast channels are designed to enable the simultaneous delivery of messages to multiple users in a particular area. A message is only delivered to a mobile communications device if it is within a predetermined range of one of the network communications antennas. A similar service has been provided for in 3G (third generation) systems, known as the service area broadcast message, and those skilled in the art will appreciate the applicability of an embodiment of the invention to both GSM and 3G systems.

The cell broadcast and service area broadcast services are different from the traditional SMS service because the SMS broadcast services are geographically-restricted, one-to-many services whereas the traditional SMS service is a one-to-one or one-to-few service.

Although these channels are optional, they are widely implemented. At present, most carry information describing the area in which the cell broadcasting signal is located, for example the name of the nearest town, the local dialing code, weather conditions, or traffic reports and the like. The information is formatted and broadcast to the user in exactly the same way as the conventional point-to-point SMS.

The broadcast message includes formatting that indicates the intended message destination within the mobile station. For example, it can sent a message explicitly to the SIM card rather than the mobile telephone handset.

Finally, following the implementation of phase 2 of the GSM standard, SIM or universal subscriber identity module (USIM) cards can carry their own applications (application programs). This enables SIMs to have a "SIM toolkit application." SIM toolkits provide additional functionality to mobile phones. For example, they allow the user to pay for utility bills such as electricity bills or to access internet banking accounts. These may run automatically, or may be called by the user by accessing a special menu in the handset user interface. If such a menu is supported by the handset, the contents of the menu are provided by the SIM by way of the standards-defined SIM toolkit interface.

DISCLOSURE OF THE INVENTION

Problem to be Solved by the Invention

The object of the present invention is to provide a method and system for updating a telephone directory of a mobile communications device.

In accordance with a first aspect of the present invention, a mobile communications device comprises: a telephone directory storage unit for storing a telephone directory comprising one or more service identifiers, each service identifier being associated with a telephone number stored in the telephone directory storage unit; a receiver for receiving a message comprising at least one telephone number and at least one associated service identifier; a comparator coupled to the telephone directory storage unit and the receiver for comparing the or each service identifier of the received message with the or each service identifier stored in the telephone directory in the telephone directory storage unit; and an update unit coupled to the comparator for updating the or each telephone number stored in the telephone directory. In this mobile communications device, if the comparator determines that the service identifier corresponding to the telephone number received in the message matches the service identifier stored in the telephone directory, the update unit updates the telephone number stored in the telephone directory with the telephone number received in the message which is associated with the service identifier.

In accordance with a second aspect of the present invention, a mobile communications device comprises: a telephone directory storage unit for storing a telephone directory comprising one or more service identifiers, each service identifier being associated with a telephone number stored in the telephone directory storage unit; a message identifier storage unit for storing one or more message identifiers; a look-up table storage unit for storing a message identifier and associated service identifier; a first comparator coupled to the telephone directory storage unit and the look-up table storage unit; a receiver for receiving a message comprising at least one telephone number, at least one associated service identifier and a message identifier; a second comparator coupled to the message identifier storage unit and the receiver; and an update unit coupled to the comparator and the telephone directory storage unit for updating the or each telephone number stored in the telephone directory. The first comparator compares the or each service identifier stored in the look-up table storage unit with the or each service identifier stored in the telephone directory, and if the first comparator determines that the service identifier stored in the telephone directory matches the service identifier stored in the look-up table, the first comparator assigns the message identifier associated with the matching service identifier stored in the look-up table to the service identifier stored in the telephone directory by storing the associated message identifier in the message identifier storage unit. The second comparator compares each message identifier of the received message with the or each message identifier stored in the message identifier storage unit. In this mobile communications device, if the comparator determines that at least one of the message identifiers stored in the message identifier storage unit is determined to match the message identifier of the received message, the or each associated service identifier of the received message is compared with the or each service identifier having a matching message identifier. If the service identifier corresponding to the telephone number received in the message is determined to match the service identifier stored in the telephone directory, the update unit updates the telephone number stored in the telephone directory with the telephone number received in the message which is associated with the service identifier. Instead of separately providing the first comparator and the second comparator, it is possible to provide a comparator which is coupled to the telephone directory storage unit, the look-up table storage unit and the comparator, and has both functions of the first comparator and the second comparator.

In accordance with a third aspect of the present invention, a mobile communications device comprises: a telephone directory storage unit for storing a telephone directory comprising one or more service identifiers, each service identifier being associated with a telephone number stored in the telephone directory storage unit; a message identifier storage unit for storing one or more message identifiers; a receiver for receiving one or more messages, each message comprising at least one telephone number, at least one associated service identifier and a message identifier; a first comparator coupled to the telephone directory storage unit and the receiver; a second comparator coupled to the message identifier storage unit and the receiver; and an update unit coupled to the comparator and the telephone directory storage unit for updating the or each telephone number stored in the telephone directory. The first comparator compares the or each service identifier stored in the telephone directory with the or each service identifier of the received message, and if the first comparator determines that the service identifier stored in the telephone directory matches the service identifier of the received message, the first comparator assigns the message identifier associated with the matching service identifier in the received message to the service identifier stored in the telephone directory by storing the associated message identifier in the message identifier storage unit. The second comparator compares each message identifier of the received message with the or each message identifier stored in the message identifier storage unit. In this mobile communications system, if the comparator determines that at least one of the message identifiers stored in the message identifier storage unit is determined to match the message identifier of the received message, the or each associated service identifier of the received message is compared with the or each service identifier having a matching message identifier. If the service identifier corresponding to the telephone number received in the message is determined to match the service identifier stored in the telephone directory, the update unit updates the telephone number stored in the telephone directory with the telephone number received in the message which is associated with the service identifier. Instead of separately providing the first comparator and the second comparator, it is possible to provide a comparator which is coupled to the telephone directory storage unit, the message identifier storage unit and the comparator, and has both functions of the first comparator and the second comparator.

In accordance with a fourth aspect of the present invention, a method of updating a telephone directory of a mobile communications device comprises steps of: storing one or more service identifiers in a telephone directory, each service identifier being associated with a telephone number stored in the telephone directory; receiving a message, the message comprising at least one telephone number and at least one associated service identifier; comparing the or each service identifier of the received message with the or each service identifier stored in the telephone directory; and if the service identifier corresponding to the telephone number received in the message is determined in the comparing step to match the service identifier stored in the telephone directory, updating the telephone number stored in the telephone directory with the telephone number received in the message which is associated with the service identifier for the or each matching service identifier in the received message.

In accordance with a fifth aspect of the present invention, a method of updating a telephone directory of a mobile communications device comprises steps of: storing one or more service identifiers in a telephone directory, each service identifier being associated with a telephone number stored in the telephone directory; assigning a message identifier to each service identifier stored in the telephone directory by comparing the or each service identifier stored in the telephone directory with the or each service identifier stored in a look-up table to output an associated message identifier to a message identifier storage unit if the service identifiers match; receiving a message, the message comprising at least one telephone number, at least one associated service identifier and a message identifier; comparing the message identifier associated with each service identifier stored in the telephone directory with the message identifier of each the received message; and if at least one of the message identifiers stored in the message identifier storage unit is determined to match the message identifier of the received message, comparing the or each associated service identifier of the received message with the or each service identifier having a matching message identifier stored in the telephone directory; and if the service identifier corresponding to the telephone number received in the message is determined to match the service identifier stored in the telephone directory, updating the telephone number stored in the telephone directory with the telephone number received in the message which is associated with the service identifier for the or each matching service identifier in the received message.

In accordance with a sixth aspect of the present invention, a method of updating a telephone directory of a mobile communications device comprises steps of: storing one or more a service identifiers in a telephone directory, each service identifier being associated with a telephone number stored in the telephone directory; assigning a message identifier to each service identifier stored in the telephone directory by receiving a message, the message comprising at least one telephone number, at least one associated service identifier and one message identifier, and by comparing the or each service identifier stored in the telephone directory with the or each service identifier in the received message to output an associated message identifier to a message identifier storage unit if the received and stored service identifiers match; repeating the assigning step until each service identifier stored in the telephone directory has been assigned a message identifier; receiving a message, the message comprising at least one telephone number, at least one associated service identifier and one message identifier; comparing the message identifier associated with each service identifier stored in the telephone directory with the message identifier of each received message; if at least one of the message identifiers stored in the message identifier storage unit matches the message identifier of the received message, comparing the or each associated service identifier of the received message with the or each service identifier having a matching message identifier stored in the telephone directory; and if the service identifier corresponding to said telephone number received in the message is determined to match the service identifier stored in the telephone directory, updating the telephone number stored in the telephone directory with the telephone number received in the message which is associated with the or each matching service identifier in the received message.

Preferably the telephone directory storage unit is the existing phone book provided in mobile communications handsets or mobile telephones, and the service identifier is a specific combination of characters stored in the identifying text that the existing phone book function stores for each telephone number.

The inventor has appreciated that a location-based service can advantageously be provided within the existing cellular infrastructure by using a largely unused channel, preferably the Cell Broadcast channel, which has the advantage that it operates transparently to the user and does not require the handset to have any location services or mobile internet capability.

| Explanations of the Reference Numerals: | |
|---|---|
| 11 | Mobile communications device; |
| 13 | Base station; |
| 15, 28 | Antenna; |
| 17 | Transmitter/receiver; |
| 19 | Comparator (CPU); |
| 21, 31 | Update unit; |
| 23 | Telephone directory storage unit; |
| 25 | Display; |
| 27 | Network transmitter/receiver; |
| 29 | Message generator; and |
| 51 | Message identifier storage unit. |

BEST MODE FOR CARRYING OUT THE INVENTION

The preferable exemplary embodiments of the present invention will be described with reference to the drawings.

Figure 1:
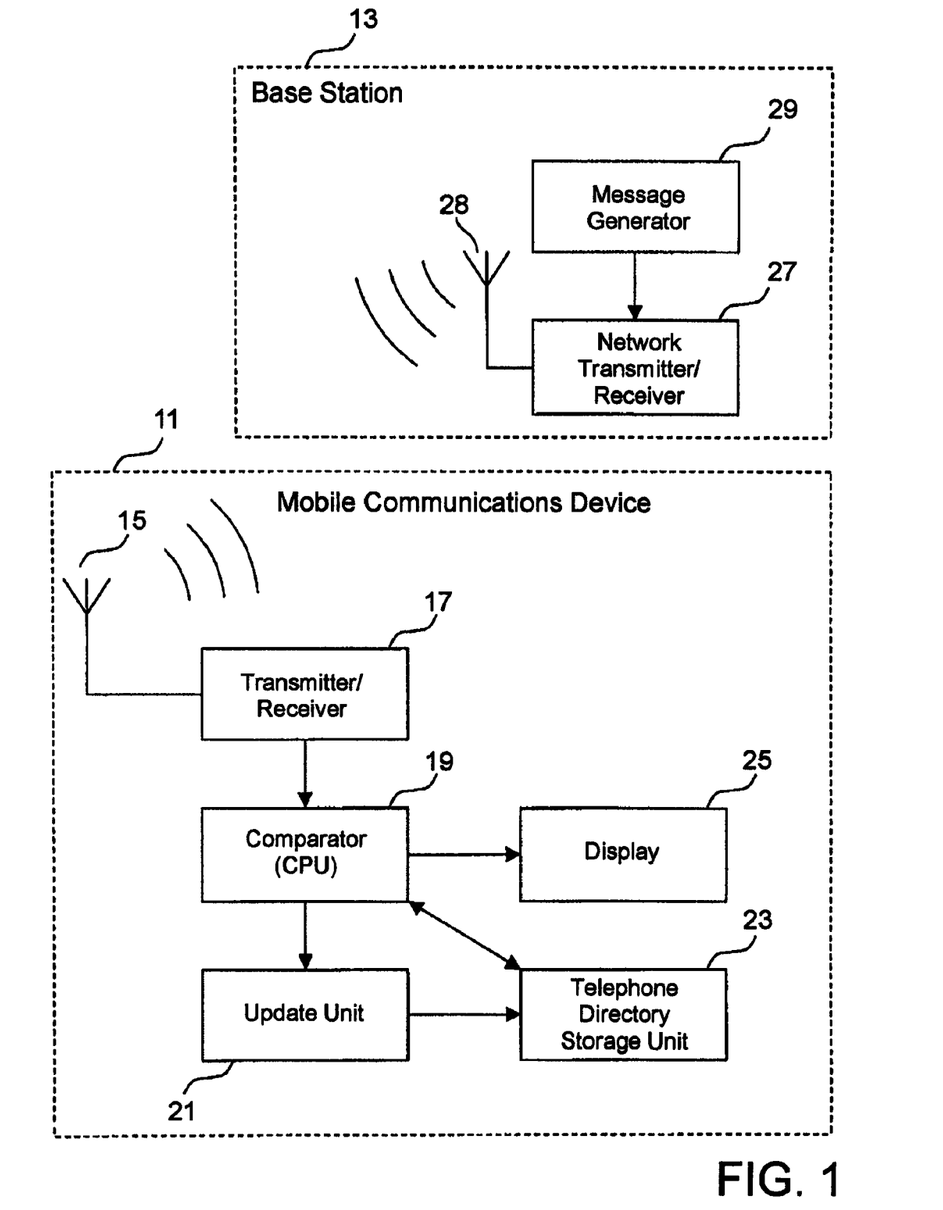
FIG. 1 is a block diagram showing main functional components of a mobile communications device and base station in a first exemplary embodiment of the present invention.

In the first exemplary embodiment of the present invention shown in FIG. 1, a mobile communications system comprises mobile communications terminal or device 11, and base station 13 which is a network transmitter.

Mobile communications device 11 comprises antenna 15, transmitter/receiver 17 to transmit and receive signals to or from base station 13 via antenna 15, comparator 19, update unit 21, telephone directory storage unit 23, and display 25. Telephone directory storage unit 23 has a function to hold the telephone directory data. Display 25 has a function to display a message, telephone number and the like to a user. Comparator 19 has a function to compare data such as a message received via transmitter/receiver 17 and identifier with data stored in telephone directory storage unit 23. Update unit 21 has a function to update the data in telephone directory storage unit 23 in accordance with the comparison result at comparator 19. Base station 13 comprises antenna 28, network transmitter/receiver 27 to transmit and receive signals to or from mobile communications device 11 via antenna 28, and message generator 29 which generates a message to be transmitted to mobile communications device 11. These functional components are described in further detail below.

Figure 2:
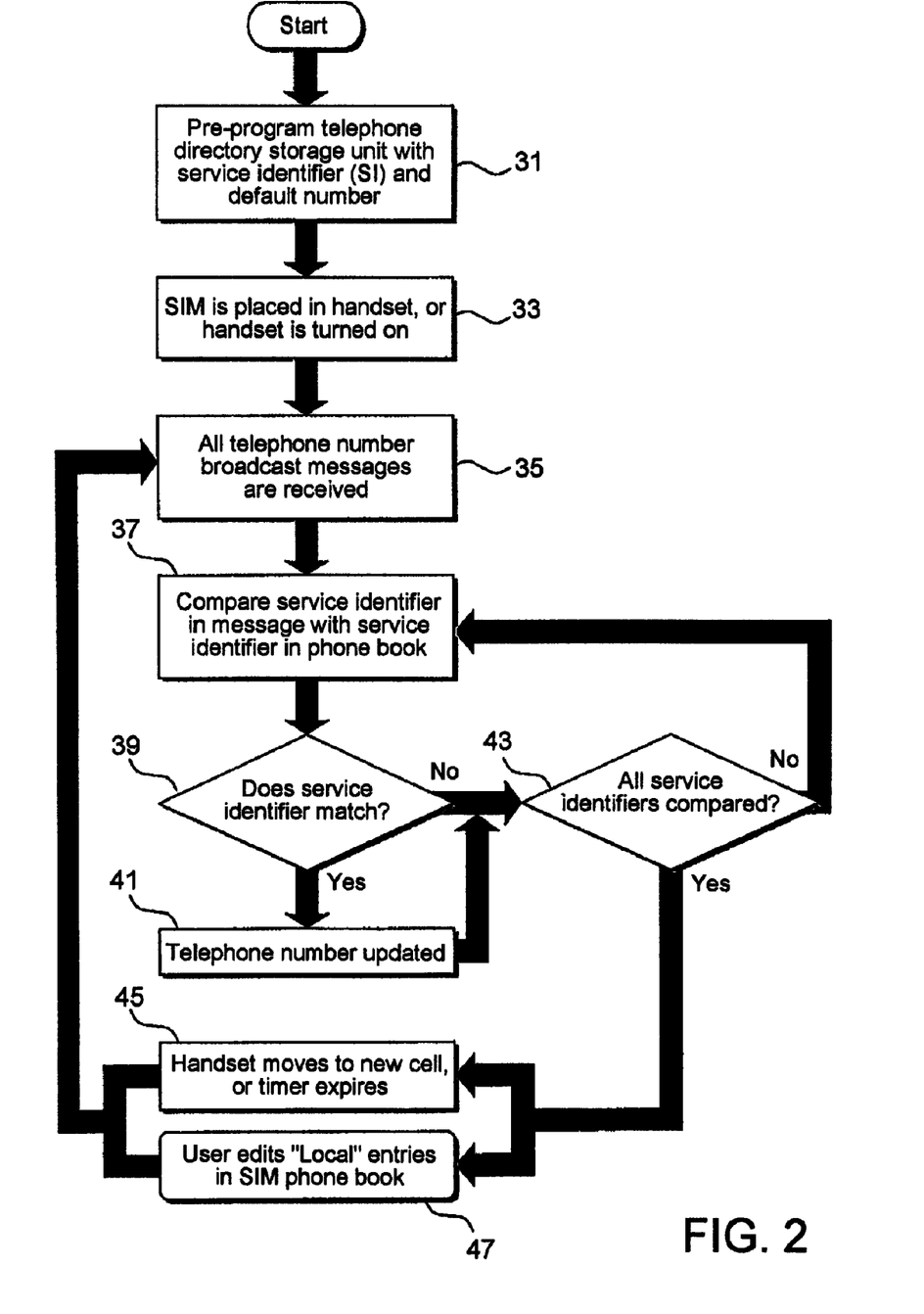
FIG. 2 is a flow chart showing main steps performed by the first exemplary embodiment.

Referring to FIG. 1 and to the flow chart in FIG. 2, when the network operator (telecommunications carrier) ships a new SIM (not shown), it pre-programs a number of entries in telephone directory storage unit 23, as shown in step 31. Alternatively, storage unit 23 may be a separate store in the body of the telephone. These entries include a completed name or service identifier (SI) field and an associated default telephone number field for each of the services that the network operator wishes to define. The service identifier is preferably an alphanumeric string. Examples of the service identifier field could be the "Local police," "Local hospital" and the like, with a default number corresponding to the national emergency code for the country in question. For example, the default number corresponding to the national emergency code is "999" in the United Kingdom, or "911" in the United States. Other fields could be specified such as "Local taxi," "Local bus company," "Local train company," "Local Chinese takeaway" or "Local Indian takeaway." In these cases, the default number could be the directory enquiries number.

Preferably, for the example illustrated in FIG. 2, as shown in step 33, when the SIM is first used in the handset, or in the case that the telephone directory storage unit exists in the mobile communications device, when the mobile communications device is first turned on, the SIM toolkit application detects the presence of these entries starting with the word "Local." This enables the telephone directory to have both "Local" entries which will be updated, and non-local entries which will not be altered or updated. Therefore, the word "Local" acts as a service update identifier which indicates an entry to be updated. However, those skilled in the art will appreciate that any other service update identifier can be used instead of the word "Local" to indicate that the entries in the telephone directory should be updated.

In the exemplary embodiment shown in FIG. 2, mobile communications device 11 then receives at step 35 from base station 13 and downloads all broadcast messages containing telephone number information and associated service identifiers. The SIM application then instructs comparator 19 to compare the text strings stored in the SIM phone book with the text strings in the received message, preferably in an SMS cell broadcast message, at step 37. Comparator 19 is preferably constituted by a CPU processor in the mobile communications device. A separate comparator could be used, but this requires modification of the mobile communications device.

At step 39, comparator 19 determines a match of the text strings, that is the presence or absence of the match in the service identifiers. If comparator 19 detects a match at this time, it notifies update unit or updater 21 that the entry in telephone directory storage unit 23 is to be updated with the received local service number, as shown in step 41. As the results, the received local service number is now stored in the SIM card phone book as the local number for that local service in place of the default number. When there is no match in step 39, comparator 19 checks if there are more local numbers in the received message to be compared with the text entries stored in the phone book, at step 43. When the match has been detected in step 39, the operation also goes to step 43 after step 41.

If the local number to be compared remains in step 43, the operation goes back to step 37 to compare and update the telephone number in the phone book as necessary. When all local numbers in that received message have been compared, the comparator passes or waits for the next message.

Once all telephone numbers in the address book have been updated, the process of steps 35, 37, 39, 41 and 43 can be repeated each time the handset moves to a new cell, or a timer expires, as shown in step 45, Alternatively, the process can be repeated each time the user edits the "local" entries in the SIM phone book, as shown in step 47.

The operation is illustrated by Table 1. This shows a part of the phone book in a mobile telephone according to the first exemplary embodiment.

TABLE 1

Part of a phone book in a mobile communications device embodying the invention.

| Name/Service identifier | Number | Default number |
| --- | --- | --- |
| Home | 01987 654321 | |
| Office | 020 7123 4567 | |
| Local taxi firm | 020 | 118 500 |
| Local hospital | 020 | 999 |
| Local Chinese | 118 500 | 118 500 |

It will be seen that in the phone book name field there are three service identifiers beginning "Local." For these entries, the phone book is extended by the inclusion of a default field. If the entry is updated by the method described with reference to FIG. 2, the number field will contain the updated number. If the entry has not been updated it will contain the default number, as shown for the Local Chinese takeaway, or alternatively it will be blank and the telephone will move to the default field to select the default number when making a call.

Using the SMS cell broadcast message, if the text and number fields are both 16 characters in length, up to five service numbers can be carried in each 160-character broadcast message.

Base station 13 includes the similar components as the conventional base station, and particularly includes network transmitter/receiver 27 and message generator 29, as shown in FIG. 1. The message generator is adapted to generate messages each of which comprises one or more telephone numbers and at least one associated service identifier. Network transmitter/receiver 27 in its transmitter function is coupled to message generator 29 for transmitting such messages generated by message generator 29 via antenna 28.

However, the first exemplary embodiment described above has the disadvantage that the mobile communications device must decode all messages, preferably GSM SMS cell broadcast, and compare the text strings of each local service in order to determine whether the local numbers are required. This must be performed every time the handset moves to a new cell or upon expiry of a timer, as shown in step 45, or each time the user edits the "local" entries in the SIM phone book, as shown in step 47. The exemplary embodiments described below seek to overcome these problems.

Figure 3:
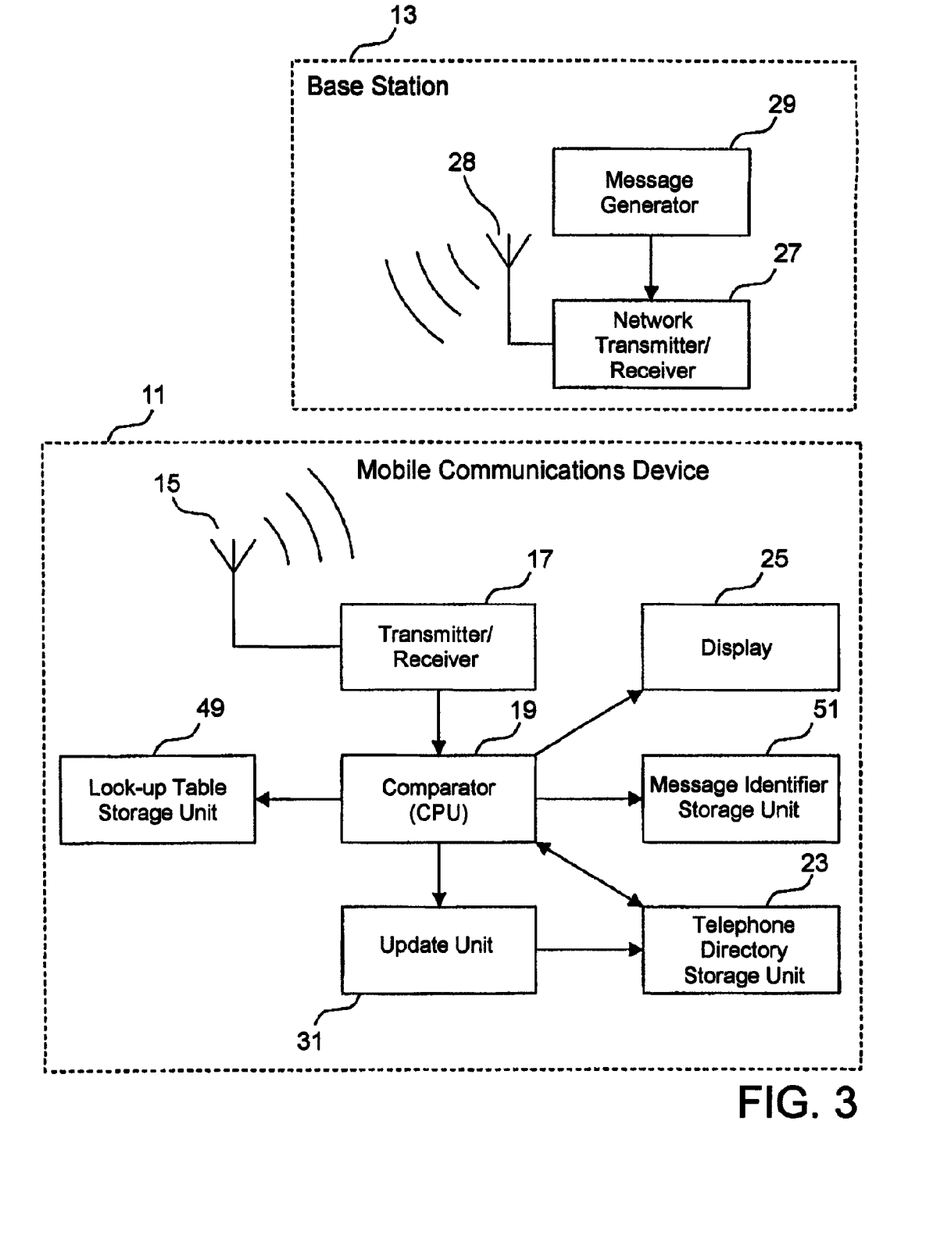
FIG. 3 is a block diagram showing main functional components of a mobile communications device and base station in a second exemplary embodiment of the present invention.
Figure 4:
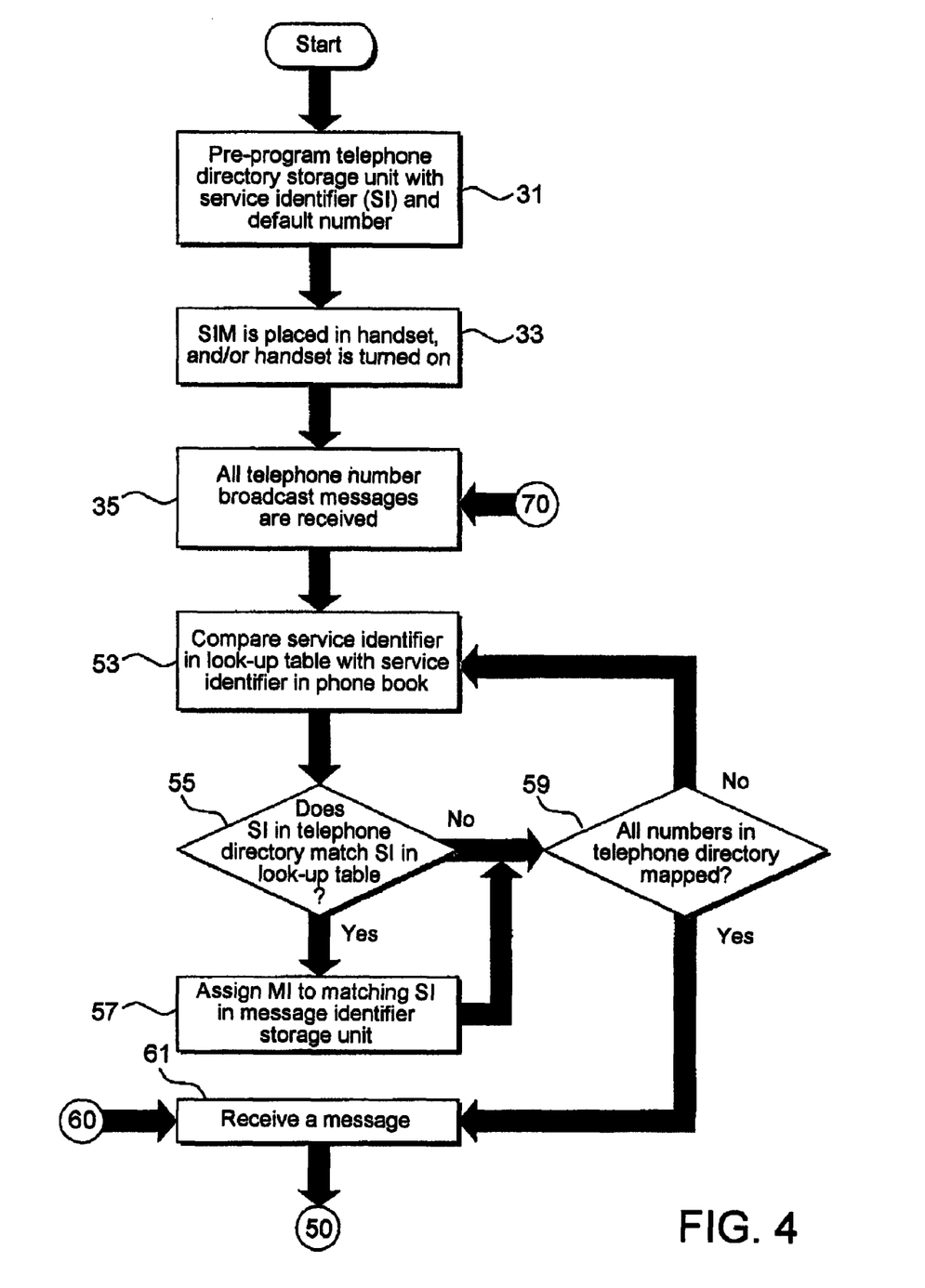
FIG. 4 is a flow chart showing main steps performed by the second exemplary embodiment.
Figure 5:
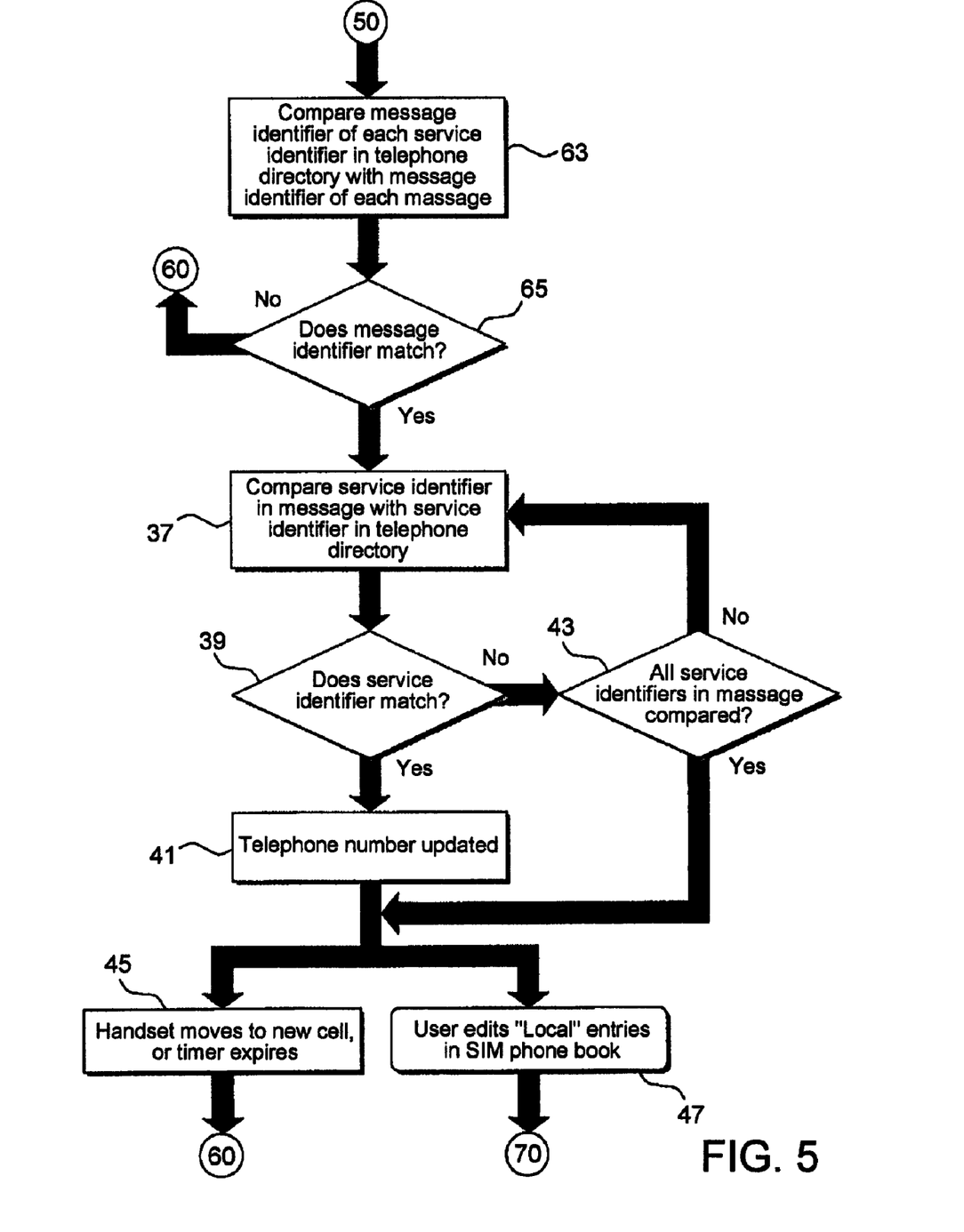
FIG. 5 is a flow chart showing the continuation of the flow chart of FIG. 4.

In the second exemplary embodiment shown in FIG. 3, mobile communications device 11 shares some common components as in the mobile communications device of the first exemplary embodiment shown in FIG. 1, and those are therefore not described again. However, in the second exemplary embodiment, mobile communications device 11 includes the additional functional components of storage unit 49 for a look-up table and message identifier (MI) storage unit 51, both connected to comparator (CPU) 19. Message identifier storage unit 51 can be provided in the phone book. Alternatively, message identifier storage unit 51 can be provided separately in the SIM or handset. These features allow additional steps to be provided in order to avoid the need to download all messages each time the phone book needs to be updated, for example when the user edits the "local" entries in the SIM phone book. To this end, additional steps 53, 55. 57, 59. 61, 63 and 65 are provided to the process shown in FIG. 2, as shown in FIGS. 4 and 5. Steps 31, 33 and 35 are the same as in the first exemplary embodiment, and will not be described further.

In steps 53, 55, 57 and 59, the phone book entries are mapped to particular broadcast messages. This involves mapping of either each telephone number or each associated text string (service identifier) to a non-unique message identifier (service type identifier) number, i.e., associating each telephone number or service identifier with one of a number of possible message identifier numbers. This step is performed by comparator 19. The message identifier numbers identify the type of information. For example, message identifier 1 could relate to the local police or local hospital fields, transportation numbers such as local taxis, trains or buses could be assigned message identifier 2, while fields relating to local restaurants such as the local Chinese, Italian or Indian restaurants or takeaways could be assigned message identifier number 3.

The message identifier serves to indicate which messages need to be decoded for each assigned information type, but is not intended as an identifier for the information itself. Providing identifiers in this way allows new information types to be added later. Preferably, when the SIM is first used in the mobile communications device, the SIM toolkit application detects the presence of those entries starting with the word "Local" or with another service update identifier if such a service update identifier has been used. The SIM toolkit application then maps these entries to message identifier numbers for the type of information and thus makes a note of the information type that needs to be downloaded.

Accordingly, as shown in step 45, when the handset moves to a new cell, or when a timer expires, steps 61 onward are repeated. In particular, the relevant broadcast messages, which are identified by their message identifiers, are received and the local service numbers are updated by performing a string comparison of the service identifiers in each broadcast message with the service identifiers of each entry stored in the telephone directory storage unit which has a matching message identifier. This cycle is then repeated to keep the local numbers up-to-date. Additionally, when the user edits the "local" entries in the SIM phone book at step 47, it is once again necessary to repeat steps 35 onwards. This is because the user may have edited the phone book to include new entries, which do not have a mapped message identifier associated with them.

The mapping of the service identifier or telephone number field to the message identifier using look-up table storage unit 49 will now be described in further detail, referring to FIGS. 3, 4 and 5. The look-up table stores a service identifier and an associated message identifier. The mapping process is performed by comparator 19, which compares the service identifier in the look-up table with those in the phone book at step 53. The result of the comparison of the service identifier in the look-up table with the service identifier in the phone book is evaluated at step 55. If it is determined that there is a match between the two entries (identifiers), then the message identifier associated with the received message is assigned to the matching service identifier by storing the value of the message identifier in the message identifier storage unit. This process is repeated, as shown in step 59, until all service identifiers in the phone book have been mapped the associated message identifiers. Once this process is complete, for each of the message identifiers required by the pre-programmed phone book entries, the SIM toolkit requests the handset to download the relevant messages. This is achieved by receiving a message at step 61, and comparing the message identifier of each service identifier in the phone book with the message identifier of each message at step 63.

As the result of evaluating at step 65 the comparison result of step 63, when there is no match between message identifies, comparator 19 passes or waits for the next message. If there is a match at step 55, then comparator 19 compares the service identifier corresponding to one of the telephone numbers in the received message with the service identifier in the phone book at step 37, in order to determine whether the entry in the phone book needs to be updated. This step 37 and following steps 39, 41 and 43 are the same as in the first exemplary embodiment shown in FIGS. 1 and 2, and so will not be described in further detail.

Next, a mobile communications system according to the third exemplary embodiment of the present invention will be described. In the mobile communications system of the third exemplary embodiment shown in FIG. 6, the mapping of the service identifier fields to the message identifier codes can be achieved by direct reference to the information being broadcast on the messages, preferably "local number" SMS cell broadcast messages. Since the signal sent can be changed at any time in this system, this system is much more flexible than the system described above The mobile communications device in the third exemplary embodiment is identical to that of the second exemplary embodiment except that a look-up table storage unit is not required, and the common components as in the second exemplary embodiment are therefore not described again. Once again, in the third exemplary embodiment, message identifier storage unit 51 can be provided in the phone book. Alternatively, it can be provided separately in the SIM or handset.

Figure 6:
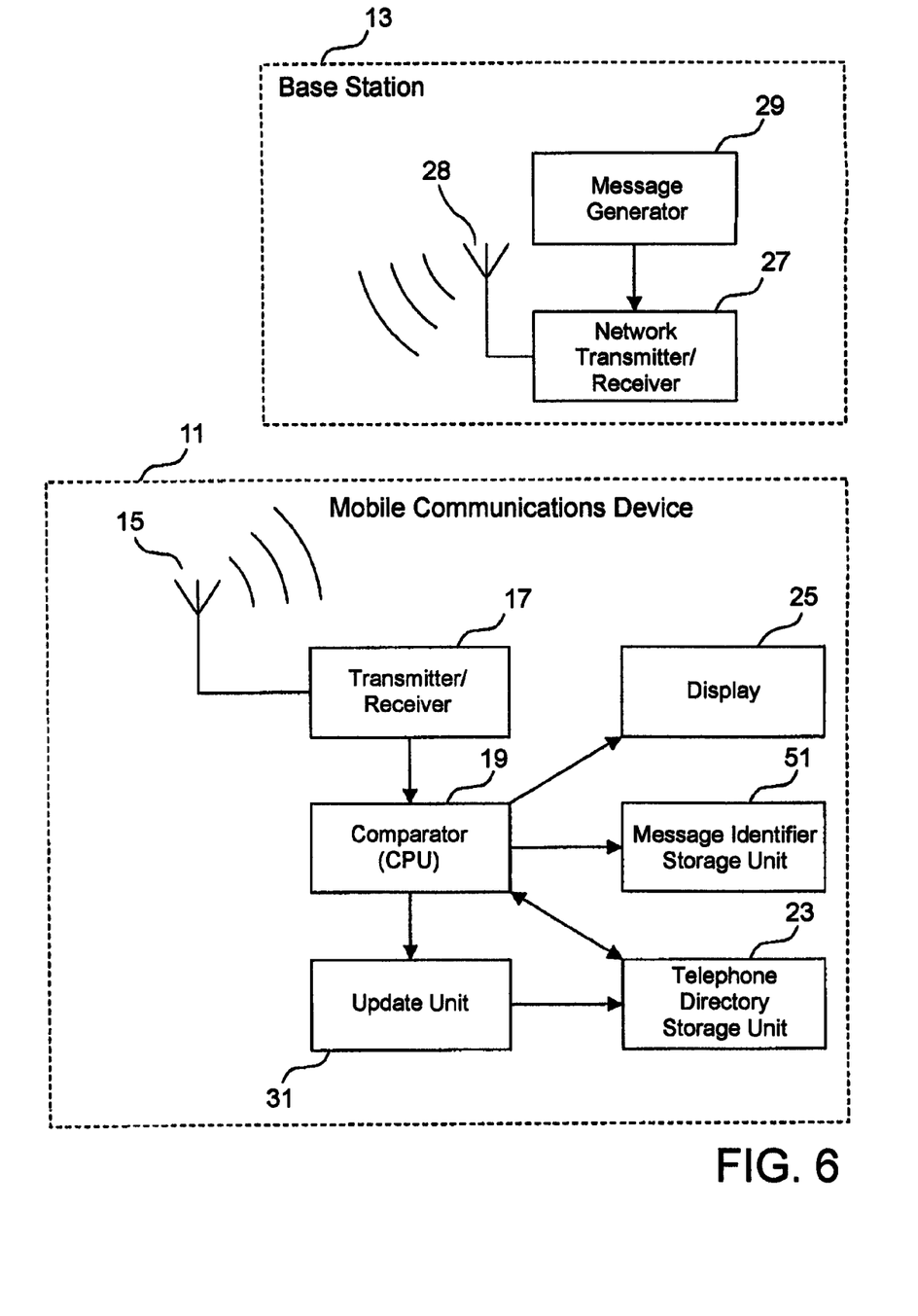
FIG. 6 is a block diagram showing main functional components of a mobile communications device and base station in a third exemplary embodiment of the present invention.

In the third exemplary embodiment, each SMS cell broadcast message comprises the following: a channel number, a message code, an update number, a language identifier and a message body. The channel number can contain the message identifier indicating the type of message contained in the message block. The message code is the ID of the specific message instance, for example a serial number. The update number is a version of a specific message, that is to say the update number differentiates between older and newer versions of the same message, within the indicated geographical area. The language identifier simply indicates which language the message is in, for example English, French or German. Finally, the message body is a text field, preferably an ASCII text field containing up to 160 characters. The message body can be formatted in the following way as shown in Table 2, allowing five service numbers and associated service identifiers to be stored in each message, provided that each is not longer than 16 characters in length.

TABLE 2

The message body of a received message formatted to store five service numbers and associated service identifiers, each up to 16 characters in length. The x indicates additional space for further characters to be added.

| Local service 1x | 012345678901xxxx |
| Local service 2x | 023456789012xxxx |
| Local service 3x | 034567890123xxxx |
| Local service 4x | 045678901234xxxx |
| Local service 5x | 056789012345xxxx |

Figure 7:
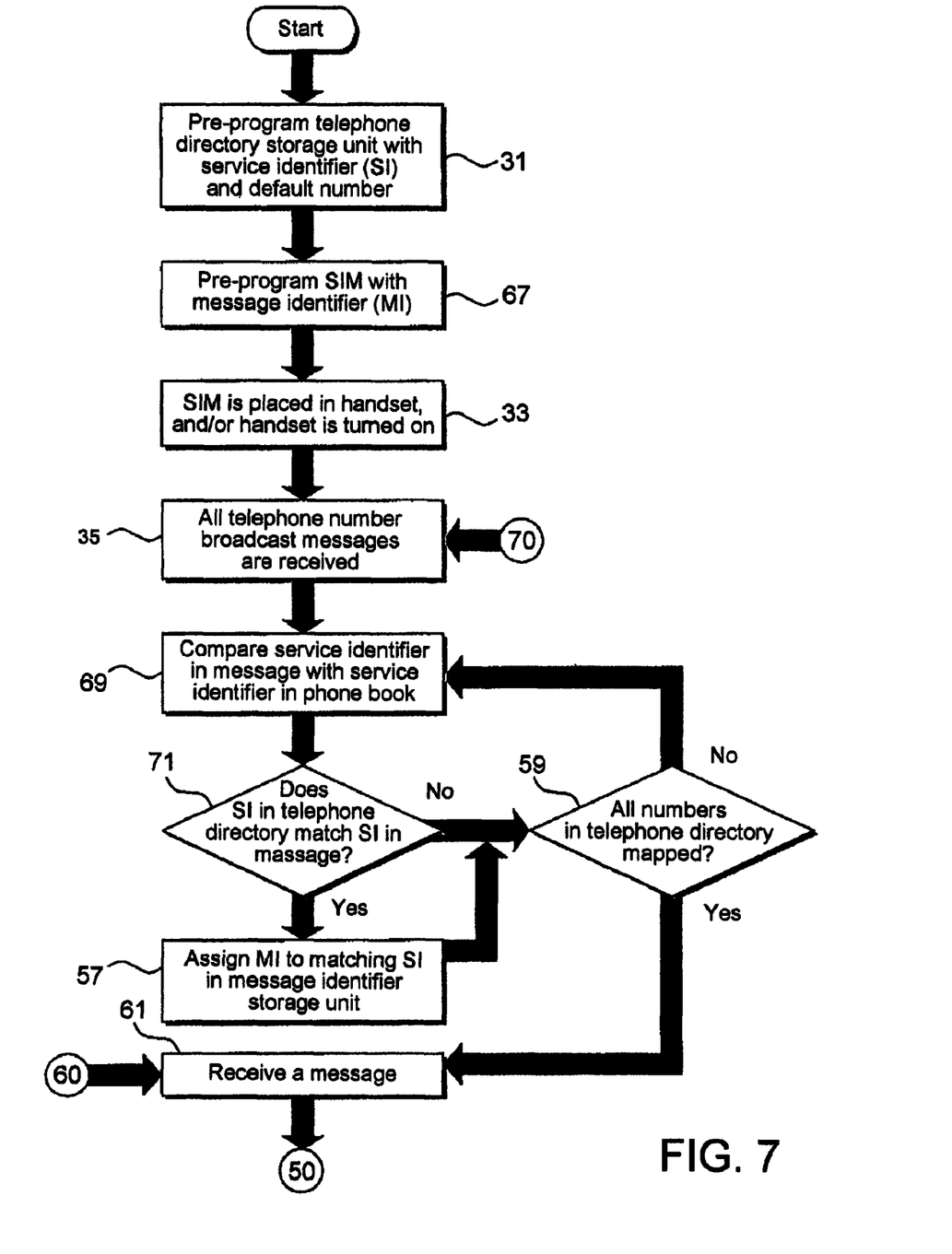
FIG. 7 is a flow chart showing main steps performed by the third exemplary embodiment.

FIG. 7 illustrates the process in the third exemplary embodiment. Note that the process after circle 50 is the same as in that shown in FIG. 5, and see FIG. 5. In the third exemplary embodiment, steps 31, 33 and 35 of the mapping process are the same as in the second exemplary embodiment and these will not be described in further detail here.

In the third exemplary embodiment, it is preferable to provide an additional step as shown in step 67, where the SIM is pre-programmed with the message identifier codes of all SMS cell broadcast channels that can contain local numbers, but with no information on which local numbers are contained within each. The pre-programmed message identifier codes can be stored in message identifier storage unit 51, since this storage unit is empty before the mapping process occurs.

As in the second exemplary embodiment, the mapping is performed by an initial reception and decoding of all broadcasts with the identifiers indicated. However, instead of using a look-up table, the contents of the received messages are then compared with the telephone numbers, preferably local telephone numbers needed by the phone book, at step 69.

For example, if the phone book contains entries for the local taxi firm, local train company and local bus company, then the received messages are searched until the text strings for these services are found at step 71, i.e., the service identifier in the telephone directory matches one of the service identifiers in the received message. The message identifiers for the messages containing those strings are then stored in message identifier storage unit 51. In future, only messages with these message identifiers need to be decoded in order to update the telephone number of the taxi firm, train company and bus company. This procedure allows a service to be mapped to a message identifier, and is repeated until all telephone numbers in the telephone directory have an associated message identifier. Preferably, each telephone number has an associated service update identifier stored in the telephone directory, for example the word "Local" can be used as a service update identifier, and this prefixes the entries in the service identifier field of the phone book. The mapping process is then repeated until all telephone numbers with a service update identifier have an associated message identifier. Once this process has been performed, the telephone numbers can be updated following steps 61, 63, 65, 37, 39, 41 and 43 as in the second exemplary embodiment shown in FIG. 5, and so this process will not be describe in further detail here.

However, in the third exemplary embodiment, as in the second exemplary embodiment, each time the user edits the entries with a service update identifier, for example the "local" entries in the SIM phone book, it is necessary to re-perform the mapping process according to steps 35, 69, 71, 57 and 59.

Using this method, the appropriate local number can be updated on the SIM phone card.

The mapping of the fields to the message identifier codes by direct reference to the information being broadcast on the messages, preferably "local number" SMS cell broadcast messages, has the advantage that the service provider may later notify the user of new message identifiers that can be supported. Then the user may enter the appropriate new phone book entry beginning with "Local," and these will automatically be picked up from the SMS cell broadcast signals.

The SIM application can be configured to request the handset to receive a message in order to update the phone book whenever the handset moves or changes to a new cell, step 45, or whenever the handset changes the routing/location area. These exemplary embodiments are preferred since they minimize power consumption by the mobile communications device. The mobile communications device is aware of which cell it is currently connected to as a result of normal handset operation.

Alternatively or additionally, the telephone numbers can be updated periodically even if no change of location occurs. The periodic update in time is the standard mode of operation of SMS cell broadcast messages, and so the handset would not require any change in order to implement this. Performing the update when the handset changes the routing/location area is not preferred since this would require changes to the handset operation.

The SIM application can also be configured to request the handset to receive an SMS cell broadcast message every time the relevant message occurs on the air interface. However, this option is power inefficient and is therefore not preferred.

Furthermore, a periodic or dynamic update without a change in location could be advantageous for a number of reasons.

Firstly, if a number of providers of the same service in the same area are paying a network operator to provide their numbers, then the operator will need to cycle between several numbers. This can be achieved by cycling the provided number after a period of time has elapsed. Alternatively, the number provided can be varied according to the number of calls that have been made to the currently indicated service provider (by call volume) or to provide a particular balance of calls between providers. This would allow the network operator to bill the service provider by call volume. Also the telephone number supplied can be varied if, for example, the number relates to a service which is time limited. For example, certain hospitals only offer accident and emergency cover during core hours. The correct number to call for the service is then time dependent and the broadcast message must reflect this.

It will thus be seen that this system provides a method for networks to find new sources of revenue. The system provides two possible new income sources by charging the users for use of the system and by charging companies to have their number to be the one provided by the system.

Preferably, a number of mechanisms can be provided to ensure a robust operation of the system.

Firstly, if the number entered as "Local" cannot be mapped to an entry in the cell broadcast signals currently being received, then the default number is used, and no updated number is present.

Secondly, if the local numbers are not already set to their default values when the handset is powered up, then the power-up operation can include a step to do this. However, this step may be omitted if the first cell found by the handset is the same as the last cell onto which it was camped before power off.

Thirdly, the user is free to delete the pre-programmed entries. This may be useful in order to free memory in the SIM or mobile communications device or to reduce the number of SMS cell broadcast receptions performed in order to save power.

Finally, if the message identifiers are assigned by comparing the service identifier strings in the received messages and those in the phone books as described above, the same service provider may later notify the user of new message identifiers that can be supported. Then the user may enter the appropriate phone book entry beginning with a service update identifier or the word "Local" and these will also be picked up from the broadcast messages.

Although the system has been describe with reference to a SIM phone book and a SIM toolkit, so that the telephone directory storage unit is in fact the SIM card mounted in the mobile telephone, those skilled in the art will appreciate the applicability of an embodiment of the invention to a handset phone book and handset applications.

Additionally, in the second and third exemplary embodiments, both the storage unit for the took-up table and that for the message identifier can be provided either in the mobile communications device itself or in the SIM card. Having the storage unit in the SIM has the advantage that it is simple, but it is relatively inflexible, since once the SIM is in the user's handset, updates to the table could only be achieved through updates to the SIM software, which is a procedure that is not undertaken on a regular basis. However, implementation in the SIM is preferable since it makes the system easier to roll out when each SIM is sold rather than with each handset.

The invention claimed is:

1. A mobile communications device comprising:
 (a) a telephone directory storage unit for storing a telephone directory comprising one or more service identifiers, each said service identifier being associated with a telephone number stored in said telephone directory storage unit;
 (b) a receiver for receiving a message comprising at least one telephone number and at least one associated service identifier;
 (c) a comparator coupled to said telephone directory storage unit and said receiver for comparing the or each said service identifier of said received message with the or each said service identifier stored in said telephone directory in said telephone directory storage unit; and
 (d) an update unit coupled to said comparator for updating the or each said telephone number stored in said telephone directory,
 wherein if the comparator determines that the service identifier corresponding to said telephone number received in said message matches the service identifier stored in said telephone directory, the update unit updates the telephone number stored in said telephone directory with the telephone number received in said message which is associated with said service identifier.

2. A mobile communications device comprising:
 (a) a telephone directory storage unit for storing a telephone directory comprising one or more service identifiers, each service identifier being associated with a telephone number stored in said telephone directory storage unit;
 (b) a message identifier storage unit for storing one or more message identifiers;

(c) a look-up table storage unit for storing a message identifier and associated service identifier;
(d) a comparator coupled to said telephone directory storage unit and said look-up table storage unit for comparing the or each said service identifier stored in said look-up table storage unit with the or each service identifier stored in said telephone directory, and if the comparator determines that the service identifier stored in said telephone directory matches the service identifier stored in said look-up table, assigning the message identifier associated with said matching service identifier stored in said look-up table to said service identifier stored in said telephone directory by storing said associated message identifier in said message identifier storage unit;
(e) a receiver for receiving a message comprising at least one telephone number, at least one associated service identifier and a message identifier;
(f) a comparator coupled to said message identifier storage unit and said receiver for comparing each said message identifier of said received message with the or each said message identifier stored in said message identifier storage unit; and
(g) an update unit coupled to said comparator and said telephone directory storage unit for updating the or each said telephone number stored in said telephone directory,
wherein if the comparator determines that at least one of the message identifiers stored in said message identifier storage unit is determined to match the message identifier of said received message, said comparator compares the or each associated service identifier of said received message with the or each said service identifier having a matching message identifier, and
wherein if the service identifier corresponding to said telephone number received in said message is determined to match the service identifier stored in said telephone directory, said update unit updates said telephone number stored in said telephone directory with the telephone number received in said message which is associated with said service identifier.

3. A mobile communications device comprising:
(a) a telephone directory storage unit for storing a telephone directory comprising one or more service identifiers, each service identifier being associated with a telephone number stored in said telephone directory storage unit;
(b) a message identifier storage unit for storing one or more message identifiers;
(c) a receiver for receiving one or more messages, each said message comprising at least one telephone number, at least one associated service identifier and a message identifier;
(d) a comparator coupled to said telephone directory storage unit and said receiver unit for comparing the or each said service identifier stored in said telephone directory with the or each service identifier of said received message, and if the comparator determines that the service identifier stored in said telephone directory matches the service identifier of said received message, assigning the message identifier associated with said matching service identifier in said received message to said service identifier stored in said telephone directory by storing said associated message identifier in said message identifier storage unit;
(e) a comparator coupled to said message identifier storage unit and said receiver for comparing each said message identifier of said received message with the or each said message identifier stored in said message identifier storage unit; and
(f) an update unit coupled to said comparator and said telephone directory storage unit for updating the or each said telephone number stored in said telephone directory,
wherein if the comparator determines that at least one of the message identifiers stored in said message identifier storage unit is determined to match said message identifier of said received message, said comparator compares the or each associated service identifier of said received message with the or each said service identifier having a matching message identifier, and
wherein, if the service identifier corresponding to said telephone number received in said message is determined to match the service identifier stored in said telephone directory, said update unit updates said telephone number stored in said telephone directory with the telephone number received in said message which is associated with said service identifier.

4. The mobile communications device according to claim 1, wherein the telephone directory storage unit is initially provided with a default telephone number associated with each service identifier in the telephone directory.

5. The mobile communications device according to claim 2, wherein the telephone directory storage unit is initially provided with a default telephone number associated with each service identifier in the telephone directory.

6. The mobile communications device according to claim 3, wherein the telephone directory storage unit is initially provided with a default telephone number associated with each service identifier in the telephone directory.

7. The mobile communications device according to claim 1, wherein the message received by the receiver is a GSM cell broadcast message.

8. The mobile communications device according to claim 1, wherein the message received by the receiver is a 3G service area broadcast message.

9. The mobile communications device according to claim 1, wherein a service update identifier associated with each service identifier or with each telephone number stored in said telephone directory is additionally stored in said telephone directory, and wherein said comparator determines whether a service update identifier is associated with each service identifier or telephone number, and only if said service update identifier is present, said telephone number is selectively updated with said received telephone number.

10. The mobile communications device according to claim 2, wherein a service update identifier associated with each service identifier or with each telephone number stored in said telephone directory is additionally stored in said telephone directory, and wherein said comparator determines whether a service update identifier is associated with each service identifier or telephone number, and only if said service update identifier is present, said telephone number is selectively updated with said received telephone number.

11. The mobile communications device according to claim 3, wherein a service update identifier associated with each service identifier or with each telephone number stored in said telephone directory is additionally stored in said telephone directory, and wherein said comparator determines whether a service update identifier is associated with each service identifier or telephone number, and only if said service update identifier is present, said telephone number is selectively updated with said received telephone number.

12. A method of updating a telephone directory of a mobile communications device, comprising steps of:
- (a) storing one or more service identifiers in a telephone directory, each service identifier being associated with a telephone number stored in said telephone directory;
- (b) receiving a message, said message comprising at least one telephone number and at least one associated service identifier;
- (c) comparing the or each said service identifier of said received message with the or each said service identifier stored in said telephone directory; and
- (d) if the service identifier corresponding to said telephone number received in said message is determined in said comparing step to match the service identifier stored in said telephone directory, updating said telephone number stored in said telephone directory with the telephone number received in said message which is associated with said service identifier for the or each matching service identifier in said received message.

13. The method according to claim 12, wherein steps (b) to (d) are repeatedly performed.

14. The method according to claim 12, wherein said telephone directory additionally stores a service update identifier associated with each service identifier or with each telephone number stored in said telephone directory, and
wherein the method further comprises a step of determining whether a service update identifier is associated with each service identifier or telephone number, and selectively updating said telephone number only if said service update identifier is present.

15. A method of updating a telephone directory of a mobile communications device, comprising steps of:
- (a) storing one or more service identifiers in a telephone directory, each service identifier being associated with a telephone number stored in said telephone directory;
- (b) assigning a message identifier to each service identifier stored in said telephone directory by comparing the or each service identifier stored in said telephone directory with the or each service identifier stored in a look-up table to output an associated message identifier to a message identifier storage unit if said service identifiers match;
- (c) receiving a message, said message comprising at least one telephone number, at least one associated service identifier and a message identifier;
- (d) comparing the message identifier associated with each service identifier stored in said telephone directory with the message identifier of each said received message;
- (e) if at least one of the message identifiers stored in said message identifier storage unit is determined to match the message identifier of said received message, comparing the or each associated service identifier of said received message with the or each said service identifier having a matching message identifier stored in said telephone directory; and
- (f) if the service identifier corresponding to said telephone number received in said message is determined to match the service identifier stored in said telephone directory, updating said telephone number stored in said telephone directory with the telephone number received in said message which is associated with said service identifier for the or each matching service identifier in said received message.

16. The method according to claim 15, wherein steps (c) to (d) are repeatedly performed.

17. The method according to claim 15, wherein step (b) is performed each time the telephone directory is edited.

18. The method according to claim 15, wherein said telephone directory additionally stores a service update identifier associated with each service identifier or with each telephone number stored in said telephone directory, and
wherein the method further comprises a step of determining whether a service update identifier is associated with each service identifier or telephone number, and selectively updating said telephone number only if said service update identifier is present.

19. A method of updating a telephone directory of a mobile communications device, comprising steps of:
- (a) storing one or more a service identifiers in a telephone directory, each service identifier being associated with a telephone number stored in said telephone directory;
- (b) assigning a message identifier to each service identifier stored in said telephone directory by receiving a message, said message comprising at least one telephone number, at least one associated service identifier and one message identifier, and by comparing the or each service identifier stored in said telephone directory with the or each service identifier in said received message to output an associated message identifier to a message identifier storage unit if said received and stored service identifiers match;
- (c) repeating step (b) until each service identifier stored in said telephone directory has been assigned a message identifier;
- (d) receiving a message, said message comprising at least one telephone number, at least one associated service identifier and one message identifier;
- (e) comparing the message identifier associated with each service identifier stored in said telephone directory with the message identifier of each said received message;
- (f) if at least one of the message identifiers stored in said message identifier storage unit matches the message identifier of said received message, comparing the or each associated service identifier of said received message with the or each said service identifier having a matching message identifier stored in said telephone directory; and
- (g) if the service identifier corresponding to said telephone number received in said message is determined to match the service identifier stored in said telephone directory, updating said telephone number stored in said telephone directory with the telephone number received in said message which is associated with the or each matching service identifier in said received message.

20. The method according to claim 19, wherein step (b) further comprises a step of pre-programming the message identifier storage unit with one or more message identifier codes of messages that contain telephone number information, and only receiving a message if said message identifier of said received message matches one or more of said message identifiers stored in said message identifier storage unit.

21. The method according to claim 19, wherein steps (b) to (c) are performed each time the telephone directory is edited.

22. The method according to claim 19, wherein steps (d) to (g) are repeatedly performed.

23. The method according to claim 19, wherein said telephone directory stores a service update identifier associated with each service identifier or with each telephone number stored in said telephone directory, and
wherein the method further comprises a step of determining whether a service update identifier is associated with each service identifier or telephone number, and selectively updating said telephone number only if said service update identifier is present.

24. The method according to claim 12, wherein the number or numbers of the service or services included in the message changes according to time of day.

25. The method according to claim 12, wherein the telephone directory is stored in a SIM card.

26. The method according to claim 12, wherein the telephone directory is stored in the mobile communications device.

27. The method according to claim 12, wherein the telephone directory is stored in both the mobile communications device and a SIM card.

28. A mobile communications system comprising:
a network transmitter adapted to transmit messages each of which comprises at least one telephone number and at least one associated service identifier; and
at least one mobile communications device, the or each mobile communications device comprising:
(a) a telephone directory storage unit for storing a telephone directory comprising one or more service identifiers, said each service identifier being associated with a telephone number stored in said telephone directory storage unit;
(b) a receiver for receiving a message comprising at least one telephone number and at least one associated service identifier;
(c) a comparator coupled to said telephone directory storage unit and said receiver for comparing the or each said service identifier of said received message with the or each said service identifier stored in said telephone directory in said telephone directory storage unit; and
(d) an update unit coupled to said comparator for updating the or each said telephone number stored in said telephone directory, wherein if the comparator determines that the service identifier corresponding to said telephone number received in said message matches the service identifier stored in said telephone directory, the update unit updates the telephone number stored in said telephone directory with the telephone number received in said message which is associated with said service identifier.

29. A mobile communications system comprising:
a network transmitter adapted to transmit messages each of which comprises at least one telephone number and at least one associated service identifier; and
at least one mobile communications device, the or each mobile communications device comprising:
(a) a telephone directory storage unit for storing a telephone directory comprising one or more service identifiers, said each service identifier being associated with a telephone number stored in said telephone directory storage unit;
(b) a message identifier storage unit for storing one or more message identifiers;
(c) a look-up table storage unit for storing a message identifier and associated service identifier;
(d) a comparator coupled to said telephone directory storage unit and said look-up table storage unit for comparing the or each said service identifier stored in said look-up table storage unit with the or each service identifier stored in said telephone directory, and if the comparator determines that the service identifier stored in said telephone directory matches the service identifier stored in said look-up table, assigning the message identifier associated with said matching service identifier stored in said took-up table to said service identifier stored in said telephone directory by storing said associated message identifier in said message identifier storage unit;
(e) a receiver for receiving a message comprising at least one telephone number, at least one associated service identifier and a message identifier;
(f) a comparator coupled to said message identifier storage unit and said receiver for comparing each said message identifier of said received message with the or each said message identifier stored in said message identifier storage unit; and
(g) an update unit coupled to said comparator and said telephone directory storage unit for updating the or each said telephone number stored in said telephone directory, wherein if the comparator determines that at least one of the message identifiers stored in said message identifier storage unit is determined to match the message identifier of said received message, comparing the or each associated service identifier of said received message with the or each said service identifier having a matching message identifier and if the service identifier corresponding to said telephone number received in said message is determined to match the service identifier stored in said telephone directory, updating said telephone number stored in said telephone directory with the telephone number received in said message which is associated with said service identifier.

30. A mobile communications system comprising:
a network transmitter adapted to transmit messages each of which comprises at least one telephone number and at least one associated service identifier; and
at least one mobile communications device, the or each mobile communications device comprising:
(a) a telephone directory storage unit for storing a telephone directory comprising one or more service identifiers, said each service identifier being associated with a telephone number stored in said telephone directory storage unit:
(b) a message identifier storage unit for storing one or more message identifiers;
(c) a receiver for receiving one or more messages, each said message comprising at least one telephone number, at least one associated service identifier and a message identifier;
(d) a comparator coupled to said telephone directory storage unit and said receiver unit for comparing the or each said service identifier stored in said telephone directory with the or each service identifier of said received message, and if the comparator determines that the service identifier stored in said telephone directory matches the service identifier of said received message, assigning the message identifier associated with said matching service identifier in said received message to said service identifier stored in said telephone directory by storing said associated message identifier in said message identifier storage unit;
(e) a comparator coupled to said message identifier storage unit and said receiver for comparing each said message identifier of said received message with the or each said message identifier stored in said message identifier storage unit; and
(f) an update unit coupled to said comparator and said telephone directory storage unit for updating the or each said telephone number stored in said telephone directory, wherein if the comparator determines that at least one of the message identifiers stored in said message identifier storage unit is determined to match said service identifier of said received message, comparing the or each associated service identifier of said received message with the or each said service identifier having a matching message identifier and if the service identifier corresponding to said telephone number received in said message is determined to match the service identifier stored in said telephone directory, updating said telephone number stored in said telephone directory with the telephone number received in said message which is associated with said service identifier.

31. A non-transitory computer-readable recording medium storing a computer program for updating a telephone directory of a mobile communications device, said computer program comprising program code adapted to perform the steps of:
(a) storing one or more service identifiers in a telephone directory, each service identifier being associated with a telephone number stored in said telephone directory;
(b) receiving a message, said message comprising at least one telephone number and at least one associated service identifier;
(c) comparing the or each said service identifier of said received message with the or each said service identifier stored in said telephone directory; and
(d) if the service identifier corresponding to said telephone number received in said message is determined in said comparing step to match the service identifier stored in said telephone directory, updating said telephone number stored in said telephone directory with the telephone number received in said message which is associated with said service identifier for the or each matching service identifier in said received message when said program is executed.

32. A non-transitory computer-readable recording medium storing a computer program for updating a telephone directory of a mobile communications device, said computer program comprising program code adapted to perform the steps of:
(a) storing one or more service identifiers in a telephone directory, each service identifier being associated with a telephone number stored in said telephone directory;
(b) assigning a message identifier to each service identifier stored in said telephone directory by comparing the or each service identifier stored in said telephone directory with the or each service identifier stored in a look-up table to output an associated message identifier to a message identifier storage unit if said service identifiers match;
(c) receiving a message, said message comprising at least one telephone number, at least one associated service identifier and a message identifier;
(d) comparing the message identifier associated with each service identifier stored in said telephone directory with the message identifier of each said received message;
(e) if at least one of the message identifiers stored in said message identifier storage unit is determined to match the message identifier of said received message, comparing the or each associated service identifier of said received message with the or each said service identifier having a matching message identifier stored in said telephone directory; and
(f) if the service identifier corresponding to said telephone number received in said message is determined to match the service identifier stored in said telephone directory, updating said telephone number stored in said telephone directory with the telephone number received in said message which is associated with said service identifier for the or each matching service identifier in said received message when said program is executed.

33. A non-transitory computer-readable recording medium storing a computer program for updating a telephone directory of a mobile communications device, said computer program comprising program code adapted to perform the steps of:
(a) storing one or more a service identifiers in a telephone directory, each service identifier being associated with a telephone number stored in said telephone directory;
(b) assigning a message identifier to each service identifier stored in said telephone directory by receiving a message, said message comprising at least one telephone number, at least one associated service identifier and one message identifier, and by comparing the or each service identifier stored in said telephone directory with the or each service identifier in said received message to output an associated message identifier to a message identifier storage unit if said received and stored service identifiers match;
(c) repeating step (b) until each service identifier stored in said telephone directory has been assigned a message identifier;
(d) receiving a message, said message comprising at least one telephone number, at least one associated service identifier and one message identifier;
(e) comparing the message identifier associated with each service identifier stored in said telephone directory with the message identifier of each said received message;
(f) if at least one of the message identifiers stored in said message identifier storage unit matches the message identifier of said received message, comparing the or each associated service identifier of said received message with the or each said service identifier having a matching message identifier stored in said telephone directory; and
(g) if the service identifier corresponding to said telephone number received in said message is determined to match the service identifier stored in said telephone directory, updating said telephone number stored in said telephone directory with the telephone number received in said message which is associated with the or each matching service identifier in said received message when said program is executed.

* * * * *